United States Patent
Finney et al.

(10) Patent No.: US 6,338,674 B1
(45) Date of Patent: Jan. 15, 2002

(54) ANAL SEALING OF CARCASSES

(75) Inventors: Andrew Leslie Finney, Logan Central; David Gregor, Brisbane Valley Highway, both of (AU)

(73) Assignee: Meat & Livestock Australia Limited, New South Wales (AU)

( * ) Notice: Subject to any disclaimer, the term of this patent is extended or adjusted under 35 U.S.C. 154(b) by 0 days.

(21) Appl. No.: 09/509,572
(22) PCT Filed: Sep. 28, 1998
(86) PCT No.: PCT/AU98/00818
§ 371 Date: Mar. 23, 2000
§ 102(e) Date: Mar. 23, 2000
(87) PCT Pub. No.: WO99/16320
PCT Pub. Date: Apr. 8, 1999

(30) Foreign Application Priority Data

Sep. 26, 1997 (AU) .............................................. P09439

(51) Int. Cl.⁷ ................................................. A22B 5/00
(52) U.S. Cl. ....................................... 452/176; 452/122
(58) Field of Search ................................ 452/176, 122

(56) References Cited

U.S. PATENT DOCUMENTS

| 4,023,237 A | 5/1977 | Meyn |
| 5,133,686 A | 7/1992 | van den Nieuwelaar et al. | 452/122 |
| 5,499,390 A | * 3/1996 | Van Ochten et al. ........ 452/122 |
| 5,688,164 A | * 11/1997 | Mills et al. .................. 452/176 |
| 5,741,176 A | 4/1998 | Lapp et al. .................. 452/122 |

* cited by examiner

*Primary Examiner*—Willis Little
(74) *Attorney, Agent, or Firm*—Drummond & Duckworth

(57) ABSTRACT

The invention provides a process and anal seal for sealing the anus of the carcass (10) of a slaughtered animal. The anal seal includes a plug (15) for insertion through the anus so that tissues (11) contract behind the plug, a clamp (20) movable towards the plug to clamp the tissues behind, and retaining means (40) to hold the clamp in its clamping position. The plug (15) is conical and has a back end (17) so that the clamp which is in the shape of a clamping disc (22) clamps against periphery (18) of the back end of the plug. The clamp (15) can slide on a stem (32) extending from the back end of the plug. The retaining means (40) can comprise biasing means (48) or a latch (41) to hold the clamp in its clamping position. An applicator tool (60) can mount the anal seal during insertion of the plug into the rectum and move the clamp from a retracted position to its operative clamping position.

12 Claims, 3 Drawing Sheets

ANAL SEALING OF CARCASSES

Figure 1:
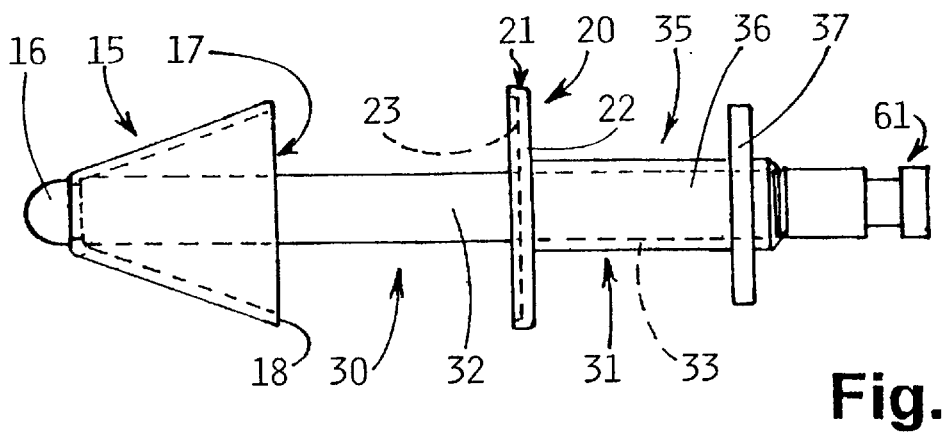

This invention relates to sealing the anus of carcasses of slaughtered animals, e.g. sheep, cattle, calves, pigs, and other species.

A number of different systems are known for sealing the anus of the carcass of a slaughtered animal. For smaller animals such as sheep and calves, it is known to provide one piece internal plugs made from plastics material, recycled paper, and the like. These plums are inserted through the anus into the rectum. One shortcoming of this type of system is that the natural elasticity of the rectum allows faecal material to move past or to dislodge these internal plugs, so that they are ineffective in preventing contamination of the carcass. Another limitation of this type of prior system is that an abattoir worker needs to manually grasp the anus and to cut around the rectum to enable the plugged rectum to be removed along with other abdominal viscera. This grasping and cutting operation can lead to contamination of the worker's hands and can increase the risk of the worker contracting some disease or being injured.

Another known system, particularly for cattle, called "bagging the anus" involves applying a plastic bag or the like over the end section of the rectum thereby enclosing the anus, the plastic bag being held in position with an elastic ring or the like tightly clamping the plastic bag around the rectum. This system has been used in manual anus sealing operations and also in mechanised or semi-automatic systems such as the one described in international patent application No. PCT/AU95/00637 (publication No. WO-96/09770). Bagging of the anus can be unsuitable where the time available for the operations on each carcass is too short to perform all the necessary operations to complete the bagging. Another drawback of this system is the unwanted introduction of polyethylene in the rendered tallow.

It is an object of the present invention to provide a process for effectively sealing the anus of the carcass of a slaughtered animal prior to subsequent processing.

It is a further object of the present invention to provide an anal seal for sealing the anus of a carcass of a slaughtered animal in an effective manner prior to subsequent processing of the carcass.

It is a further and preferred object to provide an anal seal which can minimise or prevent faecal contamination of the hands of an abattoir worker, can reduce the risk of contracting disease and can assist with the operation of cutting the rectum free of the carcass.

According to the present invention there is provided a process for sealing the anus of the carcass of a slaughtered animal, the process including the steps of clearing the hide, skin or pelt from the immediate vicinity of the anus, leaving the anal sphincter substantially intact, inserting a plug through the anus and into the rectum of the carcass of the slaughtered animal to a depth such that the sphincter muscle contracts behind and around the periphery of a back end of the plug, clamping the sphincter muscle by moving a clamp associated with the plug into a clamping position in which it engages with the sphincter muscle that has contracted behind the back end of the plug so as to clamp the sphincter muscle between the plug and the clamp, and holding the clamp in its clamping position so that the anus is sealed prior to subsequent processing of the carcass.

In the preferred embodiment the plug is provided with a stem extending out from the back end of the plug, and the clamp includes a clamping member which is slidably movable along the stem and is moved along the stem to clamp the anal sphincter against the back end of the plug. After clamping of the sphincter muscle is effected, the stem may be pulled in the caudal direction relative to the carcass to thereby apply tension to the rectum, the tensioning of the rectum being followed by the step of cutting tissues around the rectum to separate it, without puncturing or piercing the rectum, to the desired depth into the pelvic cavity of the carcass. Cutting around the rectum may be carried out by a cylindrical cutting device having a leading cutting edge and a diameter chosen to cut through the tissues surrounding the rectum but without cutting into the rectum, the cutting around the rectum being carried out by relatively advancing the cutting device while the rectum is relatively drawn in the caudal direction concentrically through the cutting device.

After the anus has been sealed and the rectum has been cut from surrounding tissues so that it is cut free from the carcass, the rectum with the anal seal remaining attached may be pulled through the pelvic canal and into the body cavity of the carcass during an evisceration process, followed by removing the rectum together with the viscera with the anal seal still in place and effectively sealing the anus, and subsequently releasing the anal seal and recovering it prior to further processing of the viscera.

According to the present invention there is also provided an anal seal for sealing the anus of the carcass of a slaughtered animal, the anal seal including a plug for insertion through the anus and into the rectum of the carcass of the slaughtered animal so that tissues contract behind the plug, a clamp associated with the plug and arranged for movement towards the plus to a clamping position in which it engages with tissues that have contracted behind the plug so as to clamp the tissues between the plug and the clamp, and retaining means to hold the clamp in its clamping position so that the anus is sealed prior to subsequent processing of the carcass.

Figure 2:
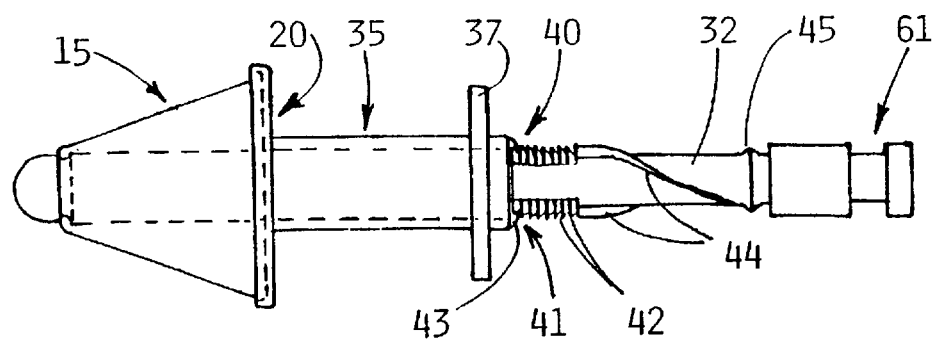
Figure 3:
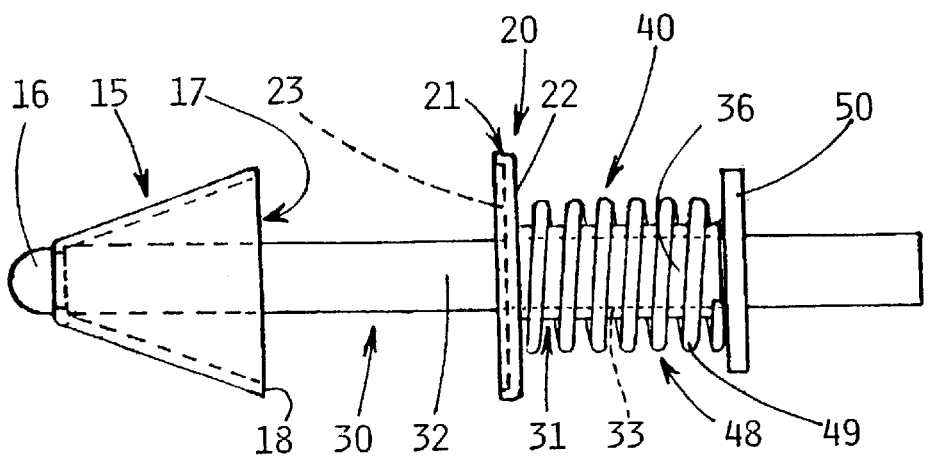
Figure 4:
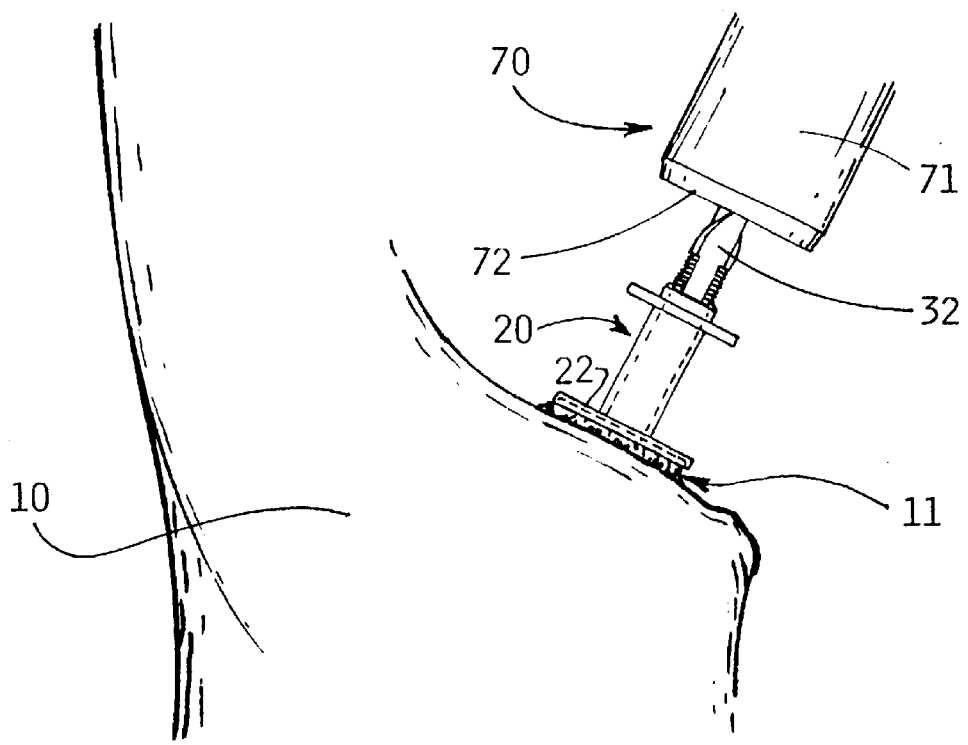
Figure 5:
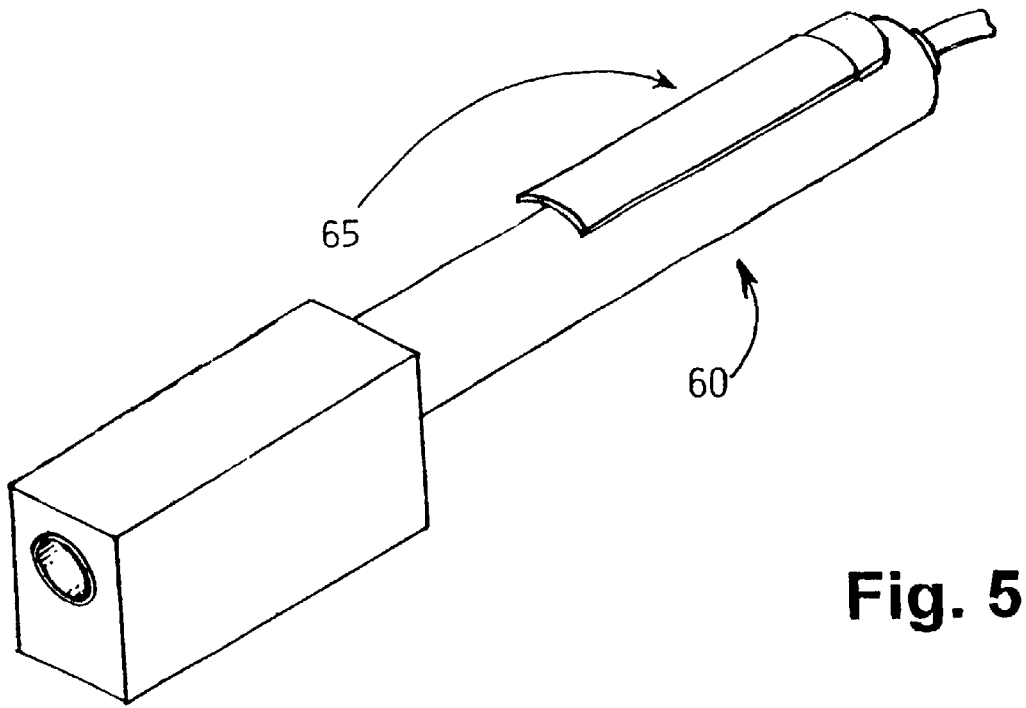
Figure 6:
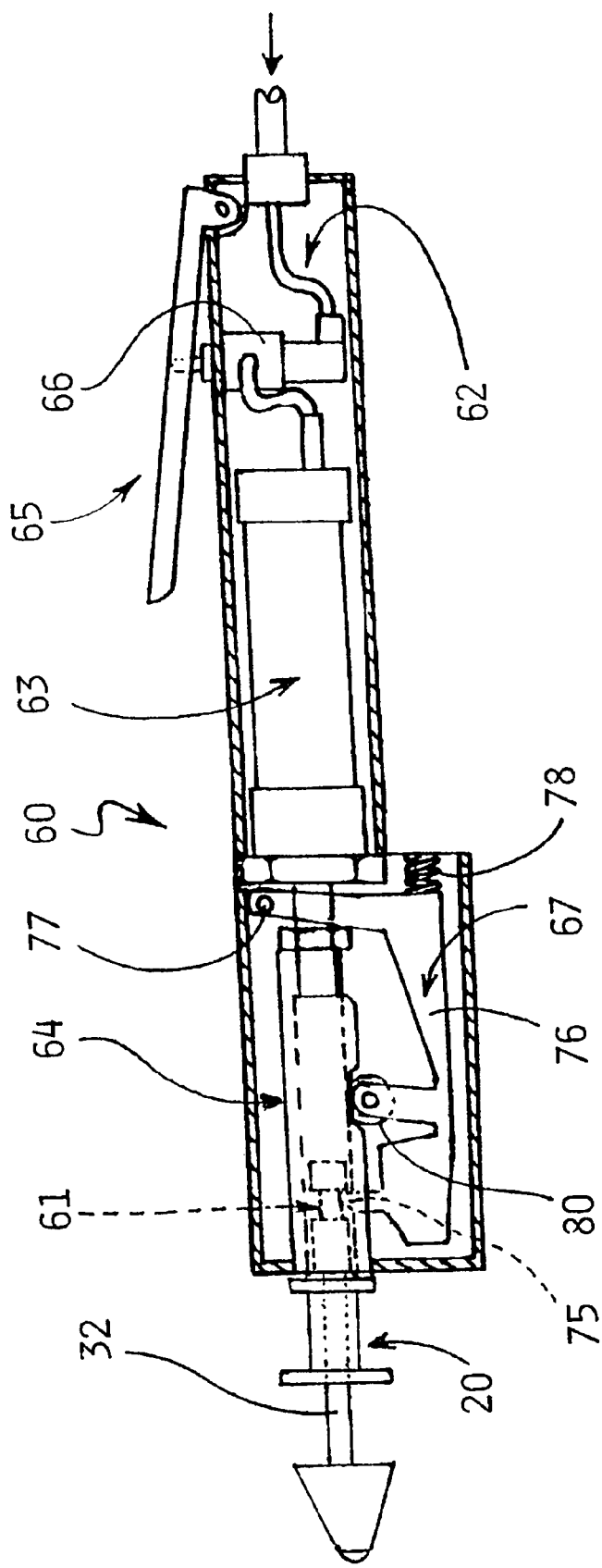

Possible and preferred features of the present invention will now be described with particular reference to the accompanying drawings. However it is to be understood that the features illustrated in and described with reference to the drawings are not to be construed as limiting on the scope of the invention. In the drawings:

FIG. 1 is a side view of an anal seal according to an embodiment of the present invention and showing the clamp retracted from the plug, FIG. 2 is a side view of the anal seal of FIG. 1 showing the clamp in its operative clamping position, FIG. 3 is a view of an alternative embodiment of an anal seal also embodying the invention, FIG. 4 is a view of the anal seal of FIGS. 1 and 2 applied to a carcass with slight tension applied preparatory to commencement of cutting around the rectum, FIG. 5 is a perspective view of an applicator tool usable in the present invention, and FIG. 6 is a side sectional view of the applicator tool.

The anal seal in the drawings is for sealing the anus of the carcass 10 of a slaughtered animal. The seal includes a plug 15 for insertion through the anus and into the rectum of the carcass 10 so that tissues 11 contract behind the plug 15. A clamp 20 is associated with the plug 15 and is arranged for movement from a retracted position (FIGS. 1 and 3) towards the plug 15 to a clamping position (FIGS. 2 and 4) in which it engages with tissues I that have contracted behind the plug so as to clamp the tissues 11 between the plug 15 and the clamp Retaining means 40 holds the clamp 20 in its clamping position so that the anus is sealed prior to subsequent processing of the carcass 10.

The plug 15 may be of any suitable shape, but in the illustrated embodiments the plug is rotationally symmetrical about a longitudinal axis, the longitudinal axis being a general direction along which the plug 15 is advanced in being inserted through the anus into the rectum. A particularly suitable shape of the plug 15 is a generally conical shape, preferably having a rounded nose 16 to avoid any sharp point which could puncture a wall of the rectum. The conical plug 15 also has a back end 17. The back end 17 is concave and has an annular peripheral area 1 8 which faces rearwardly and which forms a main sealing region as further described below. The plug 15 illustrated is a frustconical plastics moulding.

The clamp 20 which engages with tile tissues 11 around the anus to clamp the tissues between the plug 15 and clamp 20 comprises a clamping member 21 which in use is located in its clamping position behind the plug 15 after the plug has been inserted into the rectum. The clamping member 21 is operable to clamp around the entire circumference of the back end 17 of the plug 15. In the illustrated embodiments where the plug 15 is of generally conical shape, the clamping member 21 is in the shape of a clamping disc 22 having a diameter generally equal to the diameter of the back end 17 of the conical plug 15. By providing the annular peripheral area 18 on the back end of the plug which is raised relative to the concavity in the back end 17, the clamping disc 22 effectively clamps the tissues 11 between itself and the annular peripheral area 18 making an effective closure. The clamping disc 22 can be slightly larger in diameter than the peripheral area 18 and can have a complementary depression 23 to fit around the outside of the back end 17 as shown in FIG. 2.

In a particular preferred embodiment, the plug 15 and clamp 20 are provided with co-operating male and female formations 30, 31 so that the clamp 20 can be guided into its clamping position. In the drawings, the plug 15 is provided with a projection such as a stem 32 extending back from the back end 17 of the plug, and the clamp 20 is provided with a hole 33 which the stem 32 passes through so that, with this arrangement, the clamp 20 can be slid along the stem 32 to readily and accurately adopt its clamping position. In FIGS. 1 and 2, the clamp 20 is in the form of a spool 35 with the clamping disc 22 at the front end, a sleeve 36 through which the hole 33 passes, and a rear disc 37 discussed later. In FIG. 3 the spool 35 has clamping disc 22 and sleeve 36. A particular advantage of providing a stem 32 extending out from the back end 17 of the plug 15 is that this stem 32 provides a means for mounting or holding the plug 15 while it is being inserted through the anus into the rectum, or holding the plug at its desired depth of insertion to ensure effective clamping of tissues 11 which have contracted behind the plug 15, and for subsequent manipulation during cutting of he rectum free of the carcass 10 as will be described later.

In FIGS. 1, 2 and 4 the retaining means 40 for holding the clamp 20 in its clamping position comprises a positive acting latch arrangement 41 which is operated to latch or lock he clamp 20 in its clamping position and prevent release of the clamped tissues 11 by movement of the clamp 20 away from the plug 15. The positive acting latch 41 illustrated includes a row of teeth 42 along the projecting stem 32 and a co-operating resilient projection 43 on the clamp 20, e.g. at the back end of the spool 35 behind the rear disc 37, which engages with the teeth 42 as the clamping disc 22 is advanced towards its clamping position but which prevents movement of the clamping disc in the opposite direction outwardly away from its clamping position. The clamp 20 can be deliberately disengaged by providing the teeth 42 along a line at one side only of the stem 32 and not around the entire circumference whereby rotation of the spool 35 by grasping and twisting the rear disc 37 which acts as a retractor handle by, say 90°, when in its clamping position will disengage the projection 43 from the teeth 42 thereby enabling the clamping disc 22 to be retracted back along the projecting stem 32 away from its clamping position. Such deliberate disengagement can be desirable to enable for example the anal seal to be retrieved from the viscera prior to the viscera being further processed in a rendering operation.

As seen in FIG. 2 the stem 32 is provided with a helical guide 44 which cooperates with the projection 43 provided on the clamp when the clamp 20 is being retracted along the stem to cause the clamp 20 to rotate and align the projection with the line of teeth 42 ready for a subsequent use of the seal. The projection 43 engages over the ridge 45 provided around the stem 32 to releasably hold the clamp 15 in its retracted position (FIG. 1). FIGS. 2 and 4 show an embodiment in which there are two lines of teeth 42 on opposite sides of the stem 32 and respective cooperating projections 43.

The retaining means 40 of the anal seal which holds the clamp 20 in its clamping position in FIG. 3 comprises biasing means 48. The biasing means 48 comprises a compression spring 49 located between a collar 50 fixed to the stem 32 and acting against the clamping disc 22 to bias the clamping disc into its clamping position. In this embodiment of FIG. 3. the clamping disc is initially held retracted during the step of inserting the plug through the anus into the rectum. The clamping disc 22 may be held retracted against the force of the spring 49 by manually holding the disc back away from the back end 17 of the plug 15. When the plug is in the desired position and the tissues 11, particularly the sphincter muscle, have contracted behind the plug 15 the clamping disc 22 can be released to enable the spring 49 to move the disc along the stem 32 into the clamping position.

The anal seal of FIGS. 1 and 2 is designed for installation using an applicator tool 60 (FIGS. 5 and 6) which mounts the anal seal by means of the formation 61 so that the plug 15 is located forwardly of the tool and a length of the stem 32 is also projecting forwardly of the applicator tool. The clamp 20 is initially located in the retracted inoperative position enabling the applicator tool 60 to be manipulated to insert the plug 15 through the anus into the rectum and, when the plug 15 is in position and tissues 11 have contracted behind the plug, the clamp 20 can then be advanced into its operative clamping position. The applicator tool 60 includes an operating mechanism 62 which in use is operative to cause or enable the clamp 20 to advance along the stem 32 from its inoperative position to its operative clamping position. The operating mechanism 62 includes drive means 63 shown as an air ram for advancing the clamp 20 along the stem 32 upon operation of the operating mechanism 62. The operating mechanism 62 includes a trigger arrangement 65 which an operator uses to initiate operation of the drive means 63 to advance the clamp 20 by opening valve 66 to supply compressed air to the drive means 63. As the rod of the air ram constituting the drive means 63 advances, it operates the shuttle mechanism 64 to advance the clamp 20 along the stem 32 to its clamping position.

The applicator tool 60 also includes a release means 67 operative when the clamp reaches its operative clamping position to substantially simultaneously release the projecting stemn 32 from its operative association with the applicator tool 60, thereby leaving the anal seal in position sealing the anus of the carcass 10 and enabling the applicator tool 60 to have another anal seal mounted thereby and to be re-used for sealing the anus of a subsequently presented carcass. The release means 67 includes a projection 75 which projects inwardly to cooperate with the formation 61 at the end of the stem 32 to retain the anal seal mounted to the applicator tool. The projection 75 is provided by a lever 76 pivoted at point 77 and biased by spring 78 into its anal seal retaining position shown in FIG. 6. When the shuttle mechanism 64 has advanced the clamp 20 to its clamping position, tie cam follower 80 provided on the lever 76 is moved downwardly against the action of the spring 78 to release the projection 75 from the formation 61 on the stem 32, thus releasing the anal seal from the applicator tool 60. The operator can then release the trigger arrangement 65 to release the air pressure behind the piston of the air ram 63 allowing the air ram to return the shuttle mechanism 64 and enable another anal seal to be mounted by the tool.

Once the anal seal has been applied thereby sealing the anus, the cutting of the rectum free of the carcass 10 can be facilitated making use of the anal seal. In particular, by grasping the rearwardly projecting stem 32 and pulling it in the caudal direction relative to the carcass 10, the tension thereby applied to the rectum will help the operator to clearly identify the rectum and to cut around the rectum to separate it, without puncturing or piercing the rectum, to the desired depth into the pelvic cavity of the carcass. The application of the tension by pulling the anal seal also tends to straighten the rectum thereby helping the operator to cut around the rectum without piercing the rectum and contaminating the carcass.

As an alternative to manual pulling of the anal seal in the caudal direction and manual cutting around the rectum as schematically shown in FIG. 4, a mechanical cutting device 70, may be provided in association with the applicator tool 60 which holds the projecting stem 32 and applies tension in the caudal direction. The mechanical cutting device 70 comprises a cylindrical cutting member 71 surrounding and concentric with the axis of the stem 32, the cutting device having a leading cutting edge 72 having a diameter chosen to cut into the tissues surrounding the rectum but without cutting into the rectum. With this arrangement, the cutting member 71 can be relatively advanced to cut around the rectum as the rectum is relatively drawn in the caudal direction concentrically through the cutting member. This 15 mechanical cutting of the tissues to separate the rectum can be possible because the pulling force straightens the rectum so that it can pass concentrically into the cylindrical cutting member 71.

After the anus has been sealed and the rectum has been cut from surrounding tissues so that it is cut free from the carcass 10, the processing of the carcass can be continued with, for example, further steps comprising:

pulling the rectum with the anal seal attached through the pelvic canal and into the abdominal body cavity at evisceration, removing from the abdominal body cavity the rectum with the anal seal still attached together with the viscera, sending the anal seal attached to the viscera for rendering or releasing the anal seal by a simple hand action such as twisting or pulling, discarding or washing and sterilising the anal seal for reuse.

As an alternative to leaving the anal seal in position sealing the anus during subsequent processing of the carcass 10, including removing the rectum with the anal seal still attached during the evisceration of a carcass, it is also possible to use the anal seal in a rectum bagging operation analogous to the prior art. This process similar to the process described in International Patent Application No. PCT/AU95/00637 (publication No. WO-96/09770) would involve placing a plastic bag over the plug 15, followed by insertion of the plug through the anus into the rectum until the tissues 11, particularly the sphincter muscle, contract behind the plug 15. The clamp 20 would then be advanced to its clamping position so as to clamp the tissues 11 by acting through the walls of the plastic bag but without perforating the bag. The process of clearing the rectum by applying tension in the caudal direction and cutting around the rectum to the desired depth into the pelvic cavity can then be carried out, after which the bag is everted to extend along and surround the cleared rectum. The bag is then tied, clipped, or clamped around the rectum. The anal seal can then be disengaged by retracting the clamp 20 from its clamping position and withdrawing the plug 15 thereby leaving the bag in place tied around the terminal end of the rectum thereby enclosing the anus to prevent contamination of the carcass by discharge of contents from the rectum through the anus.

It will be seen that the present invention according to the preferred embodiments as described and illustrated provides an effective anal seal which can be relatively simple and quick to apply. The seal effectively seals the anus and can be used to facilitate cutting of the rectum free from the carcass either by manual cutting or by mechanised cutting.

What is claimed is:

1. An anal seal for sealing the anus of the carcass of a slaughtered animal, the anal seal including a plug for insertion through the anus and into the rectum of the carcass of the slaughtered animal so that tissues contract behind the plug, a clamp associated with the plug and arranged for movement towards the plug to a clamping position in which it engages with tissues that have contracted behind the plug so as to clamp the tissues between the plug and the clamp, the plug and clamp being provided with cooperating male and female formations so operative to guide the clamp into its clamping position to clamp the tissues that have contracted behind the plug, the male formation comprising a projection extending from the back end of the plug and the female formation comprising a hole through which the projection passes so that the clamp can be slid along the projection to accurately adopt its clamping position behind the back end of the plug, and retaining means associated with the clamp and operative to hold the clamp in its clamping position so that the anus is sealed and the anal seal assembly comprising the plug, clamp and retaining means holding the clamp in its clamping means is releasable and remains in place maintaining the anus sealed prior to and during subsequent processing of the carcass.

2. An anal seal for sealing the anus of the carcass of a slaughtered animal, the anal seal including a plug for insertion through the anus and into the rectum of the carcass of the slaughtered animal so that tissues contract behind the plug, a clamp associated with the plug and arranged for movement towards the plug to a clamping position in which it engages with tissues that have contracted behind the plus so as to clamp the tissues between the plug and the clamp, the plug and clamp being provided with cooperating male and female formations so operative to guide the clamp into its clamping position to clamp the tissues that have contracted behind the plug, the plug being provided with a projection extending from the back end thereof, the projection constituting a means for holding the plug while it is being inserted through the anus into the rectum and for holding the plug at its desired depth of insertion into the rectum to ensure effective clamping of tissues which have contracted behind the plug, and retaining means associated with the clamp and operative to hold the clamp in its clamping position so that the anus is sealed and the anal seal assembly comprising the plug, clamp and retaining means holding the clamp in its clamping means is releasable and remains in place maintaining the anus sealed prior to and during subsequent processing of the carcass.

3. An anal seal for sealing the anus of the carcass of a slaughtered animal, the anal seal including a plug for insertion through the anus and into the rectum of the carcass of the slaughtered animal so that tissues contract behind the plug, a clamp associated with the plug and arranged for movement towards the plug to a clamping position in which it engages with tissues that have contracted behind the plug so as to clamp the tissues between the plug and the clamp, and retaining means associated with the clamp and operative to hold the clamp in its clamping position so that the anus is sealed and the anal seal assembly comprising the plug, clamp and retaining means holding the clamp in its clamping means is releasable and remains in place maintaining the anus sealed prior to and during subsequent processing of the carcass, the retaining means which holds the clamp in its clamping position comprising biasing means which urges the clamp into its clamping position, the biasing means comprising a compression spring acting against the clamp to bias the clamp into its clamping position.

4. An anal seal for sealing the anus of the carcass of a slaughtered animal, the anal seal including a plug for insertion through the anus and into the rectum of the carcass of the slaughtered animal so that tissues contract behind the plug, a clamp associated with the plug and arranged for movement towards the plug to a clamping position in which it engages with tissues that have contracted behind the plug so as to clamp the tissues between the plug and the clamp, and retaining means associated with the clamp and operative to hold the clamp in its clamping position so that the anus is sealed and the anal seal assembly comprising the plug, clamp and retaining means holding the clamp in its clamping means is releasable and remains in place maintaining the anus sealed prior to and during subsequent processing of the carcass, the retaining means including a positive acting latch arrangement which is operative to latch the clamp in its clamping position and prevent release of the clamped tissues by movement of the clamp away from its clamping position.

5. An anal seal as claimed in claim 4 characterised in that the latch arrangement includes a row of teeth provided along a projecting stem extending from the oack end of the plug and a cooperating projection provided on the clamp and which engages with the teeth as the clamp is advanced towards its clamping position, the teeth preventing movement of the clamp in the opposite direction away from its clamping position.

6. An anal seal as claimed in claim 5 characterised in that the teeth are provided in a line along the projecting stem whereby rotation of the clamp around the projecting stem when in its clamping position will disengage the projection laterally from the teeth thereby enabling the clamp to be retracted back along the projecting stem away from its clamping position.

7. An anal seal as claimed in claim 6 wherein the stem is provided with a helical guide which cooperates with the projection provided on the clamp when the clamp is being retracted along the stem to cause the clamp to rotate and align the projection with the line of teeth ready for a subsequent use of the seal.

8. An anal seal for sealing the anus of the carcass of a slaughtered animal the anal seal including a plug for insertion through the anus and into the rectum of the carcass of the slaughtered animal so that tissues contract behind the plug, a clamp associated with the plug and arranged for movement towards the plug to a clamping position in which it engages with tissues that have contracted behind the plug so as to clamp the tissues between the plug and the clamp, and retaining means associated with the clamp and operative to hold the clamp in its clamping position so that the anus is sealed and the anal seal assembly comprising the plug, clamp and retaining means holding the clamp in its clamping means is releasable and remains in place maintaining the anus sealed prior to and during subsequent processing of the carcass, the anal seal further including an associated applicator tool for installing the anal seal in use the applicator tool mounting the anal seal so that the plug is located forwardly of the tool and a length of projecting stem extending from the back end of the plug is operatively associated with the applicator tool so that a length of the stem projects forwardly of the applicator tool and the clamp is located in a retracted inoperative position enabling the applicator tool to be manipulated to insert the plug through the anus into the rectum and, when the plug is in position and tissues have contracted behind the plug, the clamp can then be advanced into its operative clamping position, the applicator tool including an operating mechanism which in use is operative to cause or enable the clamp to advance along the stem from its inoperative position to its operative clamping position.

9. An anal seal as claimed in claim 8 characterised in that the applicator tool includes drive means for advancing the clamp along the stem upon operation of the operating mechanism.

10. An anal seal as claimed in claim 9 characterised in that the operating mechanism includes a trigger arrangement which an operator uses to initiate operation of the drive means to advance the clamp.

11. An anal seal as claimed in claim 8 characterised in that, the applicator tool includes a release means operative when the clamp reaches its operative clamping position to substantially simultaneously release the projecting stem from its operative association with the applicator tool, thereby leaving anal seal in position sealing the anus of the carcass and enabling the applicator tool to have another anal seal mounted thereby and to be re-used for sealing the anus of a subsequently presented carcass.

12. An anal seal as claimed in claim 8 characterised in that associated with the applicator tool is a mechanical cutting device, the mechanical cutting device being operative, when tension is applied to the rectum in the caudal direction by or through the applicator tool, to cut tissues around the rectum to a desired depth.

* * * * *